S. MAHURIN.
Cultivator and Seeder.
No. 83,187.
Patented Oct. 20, 1868.
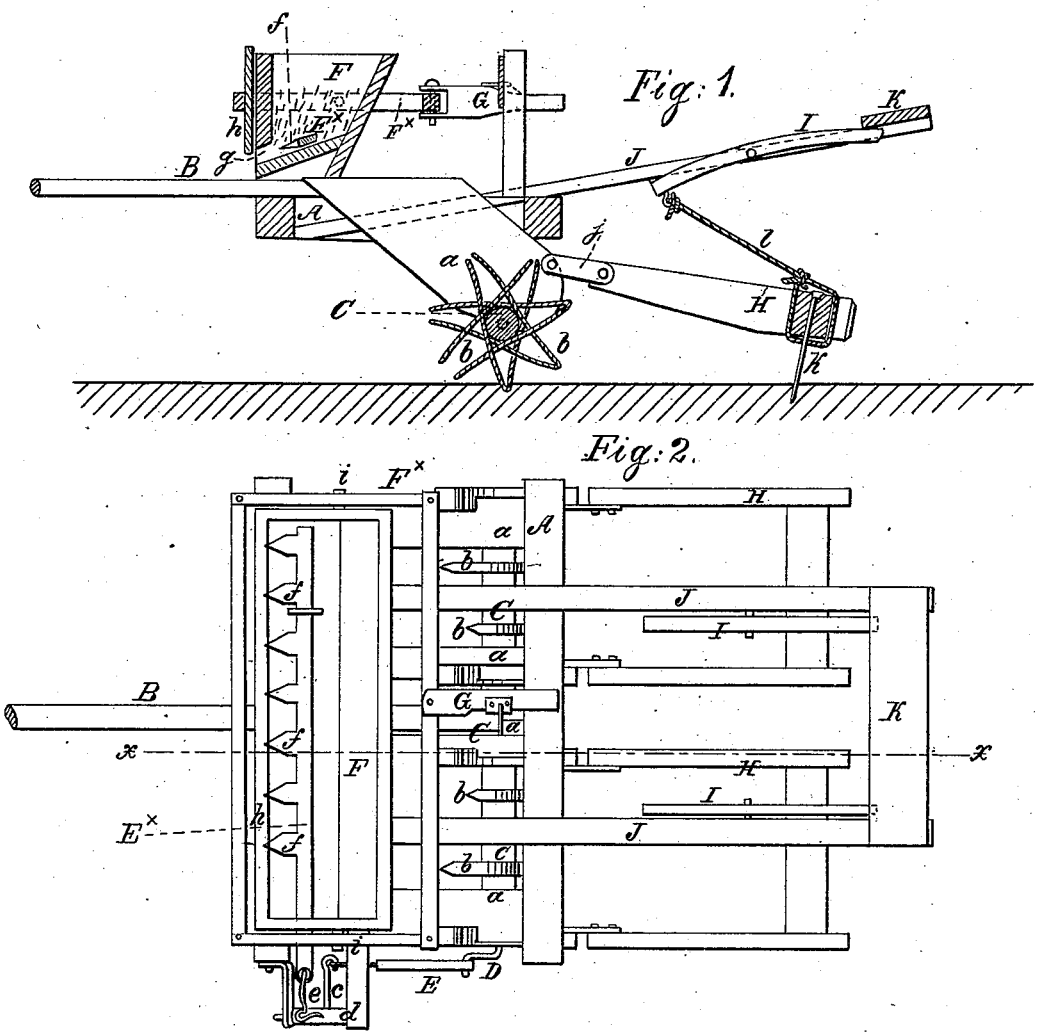

STEPHEN MAHURIN, OF CLAYTON, ILLINOIS, ASSIGNOR TO HIMSELF AND WILLIAM MONTGOMERY, OF SAME PLACE.

*Letters Patent No. 83,187, dated October 20, 1868.*

IMPROVEMENT IN ROTARY CULTIVATOR.

The Schedule referred to in these Letters Patent and making part of the same.

*To all whom it may concern:*

Be it known that I, STEPHEN MAHURIN, of Clayton, in the county of Adams, and State of Illinois, have invented a new and useful Improvement in Rotary Cultivators and Seeding-Machines; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, fig. 2.

Figure 2, a plane or top view of the same.

Similar letters of reference indicate like parts.

This invention relates to a new and improved device for cultivating the earth, and sowing seed; and it consists of one or more shafts, provided with teeth, and having a rotary motion communicated to them by the forward motion of the machine, the seed-distributing apparatus being operated from the rotary toothed shaft, and all constructed and arranged substantially as hereinafter fully shown and described.

The invention also consists in a novel application of harrows to the machine, as hereinafter set forth, for harrowing in the seed.

A represents the frame of the machine, to which the draught-pole B is attached. This frame has four pendant inclined pieces $a$ attached to it, between the lower parts of which shafts C are fitted, and allowed to turn freely, there being three shafts in all, and to each shaft C there are attached teeth $b$, which are in contact with the ground as the machine is drawn along.

To the outer end of the left-hand shaft C there is attached a crank, D, to which a rod, E, is connected, the front end of said rod being attached to an arm, $c$, which projects from a shaft, $d$, the latter being connected by a link, $e$, with a bar, $E^\times$, which is fitted longitudinally in a seed-hopper, F, on the front part of the frame A. This bar E has teeth $f$ attached to it, and it is placed directly at the rear of a slot, $g$, in the front of the hopper, which extends the whole length of the same.

It will be seen that a reciprocating motion is given the bar $E^\times$ from the roller-shaft C, which has the crank attached to its end, and that the seed is discharged from the hopper, through the slot $g$, by the reciprocating movement of the toothed bar $E^\times$.

The discharge of seed from the hopper is regulated by a slide, $h$, which is attached to a frame, $F^\times$, extending around the hopper, and working on pivots $i\,i$, said frame having a lever, G, attached to its rear end, by which the slide $h$ may be readily raised and lowered, to vary the capacity of the slot $g$, as may be required.

H H represent two harrows, which are attached by joints or links $j\,j$, to the inclined pendant bars or pieces $a$. The harrow-teeth $k$ are inserted in the rear cross-bars of the harrows, and each harrow is connected, by a chain or cord, $l$, to a lever, I. These levers are connected to inclined bars J J, on the rear parts of which the driver's seat, K, is secured. The lever I I may be operated by the foot of the driver, for the purpose of raising the harrow-teeth when required.

The teeth $b$ serve to pulverize the earth, and perfectly incorporate the seed therewith, while the teeth $k$ of the harrows cover the seed.

The device may be used as a cultivator alone, no seed being placed in the hopper in this case, and in order to cultivate or lighten up the ground between the rows of plants, the centre-shaft C is removed, so that a free, unobstructed space will be allowed for the plants, a shaft, C, with its teeth, working at each side of the row of plants, and a horse walking in each space, the machine "straddling" the row, as it is commonly termed.

Having thus described my invention,

I claim as new, and desire to secure by Letters Patent—

1. The rotary toothed shafts C, two or more, in combination with the reciprocating toothed bar, E, operated from one of the shafts C, substantially as and for the purpose set forth.

2. The combination of the reciprocating toothed bar E, with the slot $g$, in the front side of the hopper F, and the adjustable slide, $h$, attached to the pivoted frame $F^\times$, all arranged substantially in the manner as and for the purpose specified.

3. The harrows H H, attached by hinges or joints $j\,j$, in combination with the rotary toothed shafts and the seed-distributing apparatus, all arranged substantially as and for the purpose set forth.

STEPHEN MAHURIN.

Witnesses:
E. LOYD,
S. J. MOREY.